United States Patent
Dostie, Jr. et al.

(10) Patent No.: US 12,474,936 B2
(45) Date of Patent: Nov. 18, 2025

(54) INTELLIGENT USER INTERFACE FOR INTERRELATED SERVICES

(71) Applicant: Boost SubscriberCo L.L.C., Englewood, CO (US)

(72) Inventors: Thomas Edward Dostie, Jr., Highlands Ranch, CO (US); Sharath Venkatarao, Aurora, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 79 days.

(21) Appl. No.: 18/134,429

(22) Filed: Apr. 13, 2023

(65) Prior Publication Data

US 2023/0333865 A1    Oct. 19, 2023

Related U.S. Application Data

(60) Provisional application No. 63/331,201, filed on Apr. 14, 2022.

(51) Int. Cl.
*G06F 9/451*    (2018.01)
*G06Q 10/087*    (2023.01)

(52) U.S. Cl.
CPC ........... *G06F 9/451* (2018.02); *G06Q 10/087* (2013.01)

(58) Field of Classification Search
CPC ............................. G06F 9/451; G06Q 10/087
See application file for complete search history.

(56) References Cited

U.S. PATENT DOCUMENTS

| | | | | |
|---|---|---|---|---|
| 9,258,195 B1* | 2/2016 | Pendleton | ............... | H04L 41/22 |
| 2010/0142446 A1* | 6/2010 | Schlicht | .................. | H04W 4/20 |
| | | | | 370/328 |
| 2013/0332303 A1* | 12/2013 | Schank | ............... | H04L 43/0817 |
| | | | | 705/26.4 |
| 2017/0235466 A1* | 8/2017 | Tanwir | .................. | G06F 3/0481 |
| | | | | 715/738 |
| 2018/0018082 A1* | 1/2018 | Sarbin | ................. | H04L 41/0893 |
| 2018/0136791 A1* | 5/2018 | Soni | ....................... | H04L 51/046 |
| 2018/0287876 A1* | 10/2018 | Strobel | ............... | H04L 67/1004 |
| 2018/0300160 A1* | 10/2018 | Omiya | ................ | G06F 3/04817 |

OTHER PUBLICATIONS

5G Americas White Paper (Management Orchestration and Automation, published Nov. 2019, pp. 1-67) (Year: 2019).*

* cited by examiner

*Primary Examiner* — Tan H Tran
(74) *Attorney, Agent, or Firm* — Kipman T. Werking; Frontier IP Law PLLC

(57) ABSTRACT

Example embodiments are directed towards an intelligent user interface for interrelated services. The data-rich ecosystem of a telecommunication service provider's wireless network is leveraged in creative and intuitive ways to bring data points to users' fingertips how they need it and when they need it. A single pane of glass is made up of selectable and controllable user interface elements that paint a larger picture together of the telecommunication service provider's network and individual components thereof. For example, the system may electronically provide a plurality of software services, each having a respective user interface (UI), and electronically orchestrate, at a service orchestration layer, the plurality of software services such that when any one service of the plurality of services is used, usage of the one service automatically affects what data is presented or how the data is presented in one or more respective user interfaces of other services of the plurality of services.

14 Claims, 5 Drawing Sheets

INTELLIGENT USER INTERFACE FOR INTERRELATED SERVICES

TECHNICAL FIELD

The present disclosure relates generally to user interfaces, more particularly, to an intelligent user interface for interrelated services.

BRIEF SUMMARY

As a wireless telecommunication service provider builds and maintains their network (such as a cloud-native 5G wireless network), it has multiple systems and user communities who need to be able to interact with data across those systems daily. It is with respect to these and other considerations that the embodiments described herein have been made.

The data-rich ecosystem of a telecommunication service provider's wireless network is leveraged in creative and intuitive ways to bring data points to users' fingertips how they need it and when they need it. In particular, a single pane of glass is made up of selectable and controllable user interface elements, which may be referred to herein as "SmartTiles", that paint a larger picture together of the telecommunication service provider's network and individual components thereof. Such SmartTiles may provide: the ability for users to define what, and how much, they see; the ability to zoom in to various parts of the network and the telecommunication service provider's customers' service data—and see how those domains relate to each other; intuitive, easy-to-use navigation of the entire network; and the telecommunication service provider's wireless data model at the user's fingertips.

Briefly described, embodiments disclosed herein are directed to an intelligent user interface for interrelated services. For example, a method for an intelligent user interface for interrelated services may include electronically providing a plurality of software services, each having a respective user interface (UI), and electronically orchestrating, at a service orchestration layer, the plurality of software services such that when any one service of the plurality of services is used, usage of the one service automatically affects what data is presented or how the data is presented in one or more respective user interfaces of other services of the plurality of services.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
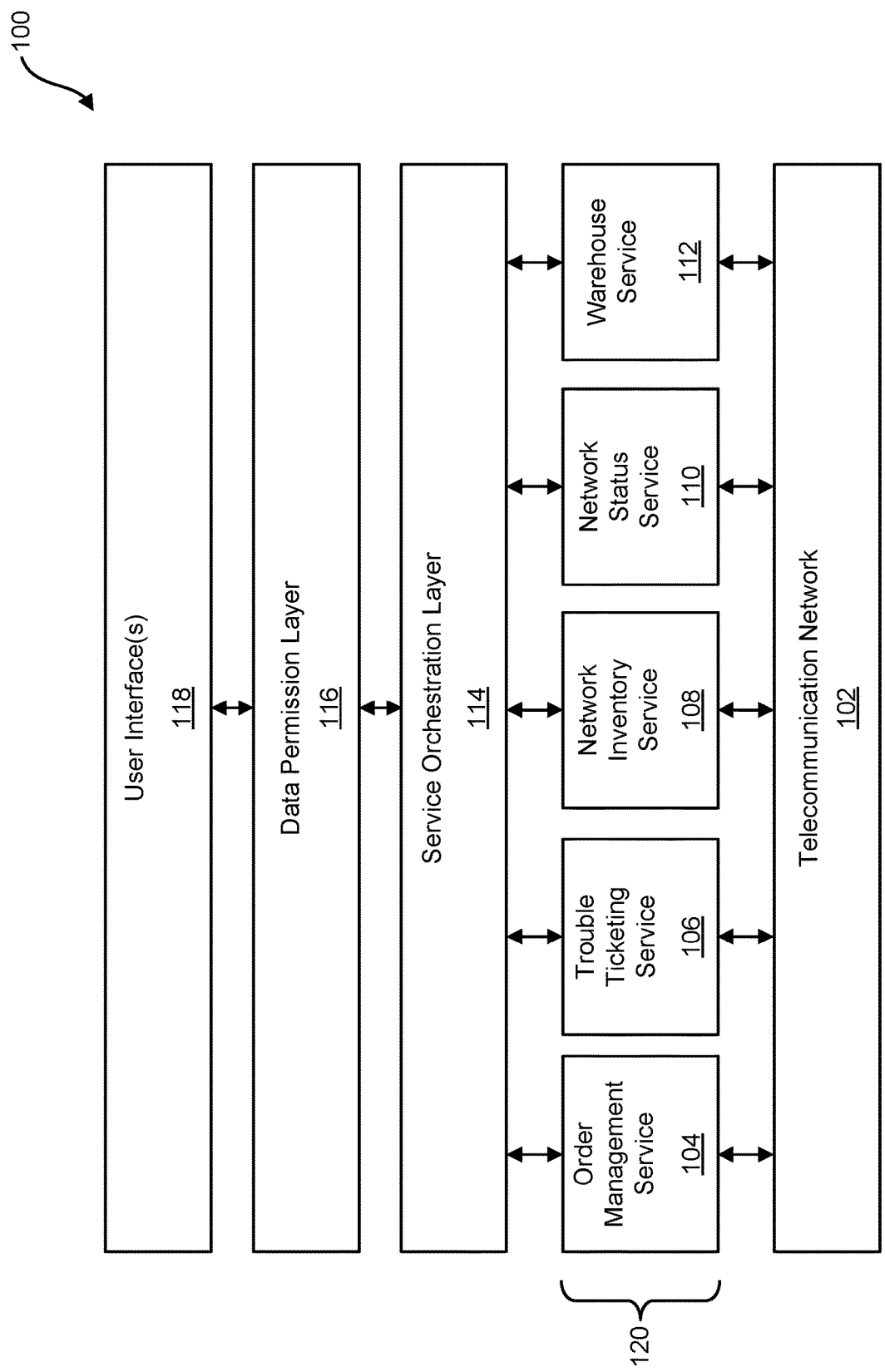
FIG. 1 illustrates a diagram of an example system for an intelligent user interface for interrelated services in accordance with embodiments described herein.

FIG. 1 illustrates a diagram of an example system 100 for an intelligent user interface for interrelated services in accordance with embodiments described herein.

Shown is a telecommunication network 102. However, the system 100 may be based on and/or applied to other communication or computer networks in various different embodiments. Also shown are various example individual software services 120, such as operations support systems and business support systems (OSS/BSS) of the telecommunication network 102. Such services 120 may support operation and maintenance of the telecommunication network 102 and may electronically interact directly or indirectly with the telecommunication network 102, network functions of the telecommunications network 102, network equipment of the telecommunications network 102, other OSS/BSS of the telecommunications network 102, and/or other components of the telecommunications network 102 in order to provide such services 120. Such services 120 may include, may be implemented in, may support or may be accessible via, various forms of software including, but not limited to: microservices, plug-ins, software-as-a-service (SaaS) platforms, containerized software services, cloud-native services, web services, those being accessible via application programming interfaces (APIs), etc.

In the present example, the services 120 include, but are not limited to: an order management service 104, a trouble ticketing service 106, a network inventory service 108, a network status service 110 and a warehouse service 112. Each of the services 120 may have a respective user interface (UI) that comprise user interface(s) (UIs) 118. In an example embodiment, each of the services 120 is also in operable communication with a service orchestration layer 114, which is another software component that electronically orchestrates the plurality of software services 120 such that when any one service of the plurality of services is used, usage of the one service automatically affects what data is presented or how the data is presented in one or more respective UIs 118 of other services of the plurality of services 120. For example, when a user is interacting with the UI of the trouble ticketing service 106 to view details of a trouble ticket related to a particular piece of network equipment, the service orchestration layer 114 may automatically pull data from the network inventory service 108 about that particular piece of network equipment to show in the UI of the trouble ticketing service 106 while the user is viewing the details of the trouble ticket having to do with that particular piece of network equipment.

Also shown is a data permission layer 116 in operable communication with the service orchestration layer 114 and the UIs 118 of the plurality of services 120. The data permission layer 116 is a software component that determines whether the data that is presented in one or more respective UIs 118 of the plurality of services 120 as a result of the orchestration by the service orchestration layer 114 is editable by a user to update internal databases used by the plurality of services 120. For example, such determinations may be made on a per user basis, based on how the data was accessed, a current UI, and/or based on which service of the plurality of services 120 was initially used to obtain the data.

The service orchestration layer 114, the data permission layer 116 and/or the UIs 118 may include, may be implemented in, may support or may be accessible via, various forms of software including, but not limited to: microservices, plug-ins, software-as-a-service (SaaS) platforms, cloud-native services, containerized software services, web services, those being accessible via APIs, etc. Also, interactions and/or communication between the components shown in FIG. 1 may be over various computer and communication networks and communication platforms at various different levels, including, but not limited to: the Internet, local area network (LANs), wide area networks (WANs), wired and/or wireless networks, communication busses, event streaming services, virtual private networks (VPNs), cloud computing platforms, peer-to-peer network, SaaS platforms, APIs, and other various other communication platforms and networks.

Other components, configurations, and connections between such components of the system 100 than shown in FIG. 1 may be present in various different embodiments.

Figure 2:
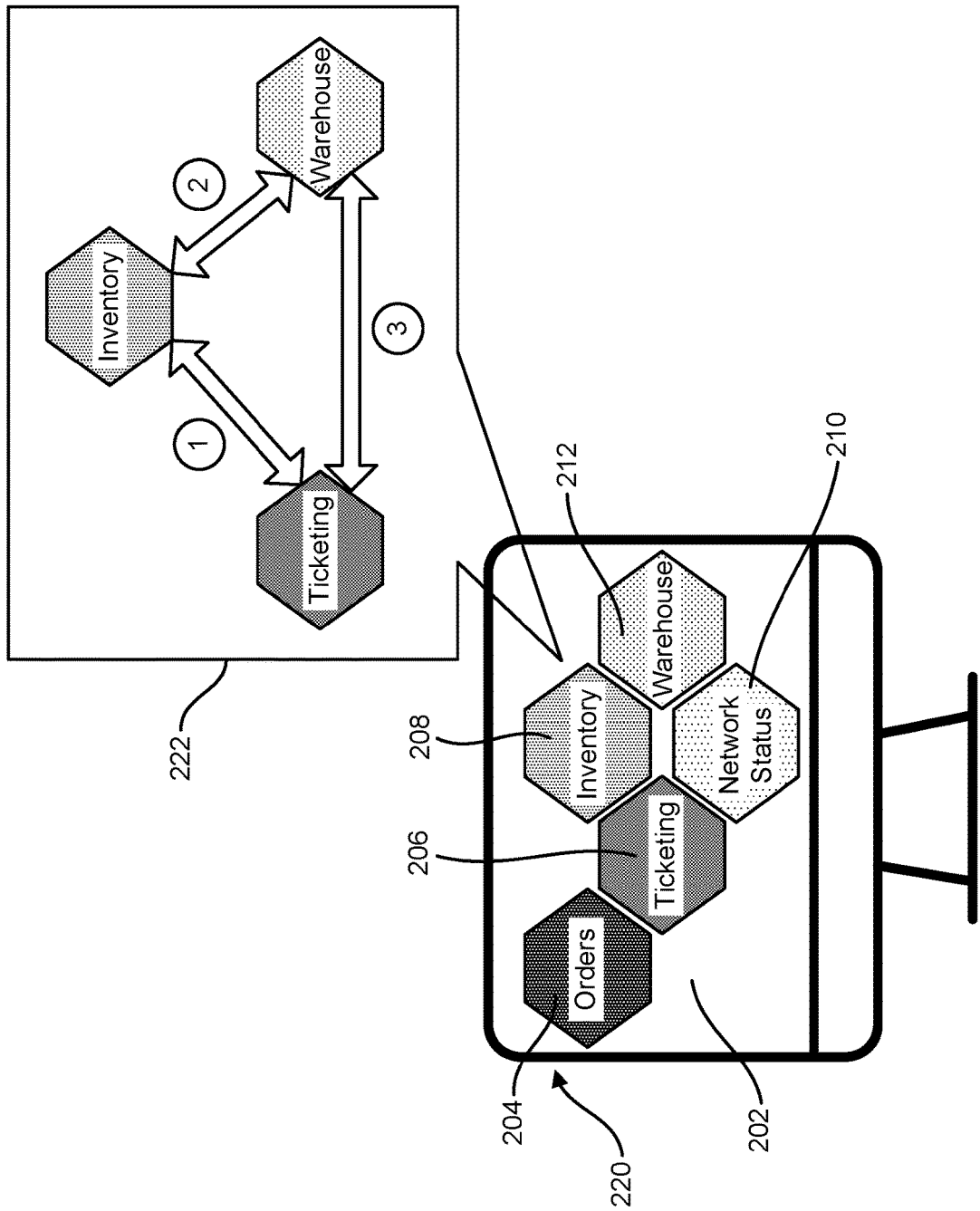
FIG. 2 is a diagram of example user interface and underlying relationships between associated services in the system for an intelligent user interface for interrelated services of FIG. 1 in accordance with an embodiment described herein.

FIG. 2 is a diagram of an example user interface 220 and example underlying relationships between associated services in the system 100 of FIG. 1 in accordance with an embodiment described herein.

In the present example illustrated in FIG. 2, shown displayed on a single screen 202 is a respective selectable user interface element or "SmartTile" for each respective UI of the plurality of software services 120 shown in FIG. 1. When selected, the respective SmartTile opens the respective UI of the software service. In particular, shown on the screen 202 is the orders SmartTile 204 for the order management service 104, the ticketing SmartTile 206 for the trouble ticketing service 106, the inventory SmartTile 208 for the network inventory service 108, the network status SmartTile 210 for the network status service 110 and the warehouse SmartTile 212 for the warehouse service 212.

The SmartTiles and underlying services they provide access to within the framework described herein are built on or according to a foundation of industry and technology knowledge. In particular, the inventory SmartTile 108 and/or the service it provides access to understand what type of data it serves, and what can be done with that data—as well as how that data connects to data in other SmartTiles. For example, the ticketing SmartTile 206 and the trouble ticketing service 106 it provides access to provide interactions that are natural to 5G wireless ticketing, including, but not limited to: creating a trouble ticket, updating a trouble ticket, closing a trouble ticket and searching for trouble ticket by Generic Public Subscription Identifier (GPSI), subscriber, etc. The inventory SmartTile 208 and the network inventory service 108 it provides access to provide interactions that are natural to 5G wireless inventory, including, but not limited to: searching for topology; requesting cellular (cell) site information based on a call record and checking for model numbers in service. The warehouse SmartTile 212 and the warehouse service 112 it provides access to provide interactions that are natural to 5G wireless warehouses, including, but not limited to: searching for device type (phone or router), placing an order for new equipment, and sending equipment to a cell site or customer.

A relationship diagram 222 shows example relationships between the ticketing SmartTile 206, the inventory SmartTile 208 and the warehouse SmartTile 212 (and the respective services they provide access to) that utilize the interactions that are natural to the respective services described above. In particular, shown is relationship 1 between the ticketing SmartTile 206, the inventory SmartTile 208, relationship 2 between the inventory SmartTile 208 and the warehouse SmartTile 212 and relationship 3 between the warehouse SmartTile 212 and the ticketing SmartTile 206. Thus, all the SmartTiles and the underlying services they provide access to are related to each other and share data with each other such that when any one service is used, usage of the that service automatically affects what data is presented or how the data is presented in one or more respective user interfaces of the other services.

Figure 3:
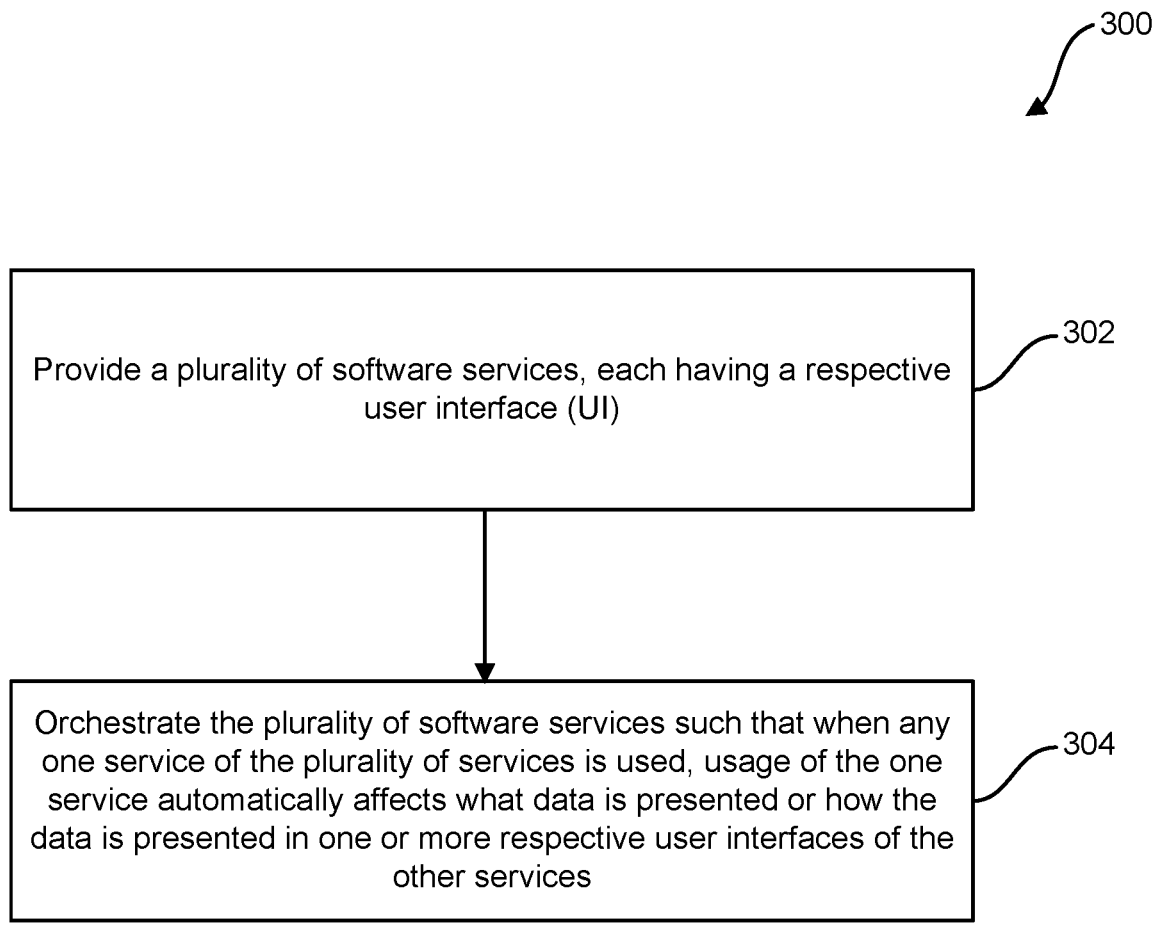
FIG. 3 illustrates a logical flow diagram showing an example embodiment of a process for an intelligent user interface for interrelated services in accordance with embodiments described herein.

FIG. 3 illustrates a logical flow diagram showing an example embodiment of a process 300 for an intelligent user interface for interrelated services in accordance with embodiments described herein.

At 302, the system 100 electronically provides a plurality of software services, each having a respective user interface (UI).

At 304, the system electronically orchestrates, at a service orchestration layer, the plurality of software services such that when any one service of the plurality of services is used, usage of the one service automatically affects what data is presented or how the data is presented in one or more respective user interfaces of other services of the plurality of services. The system 100 may display on a single screen a respective selectable user interface element for each respective UI of the plurality of software services, that, when selected, the respective selectable user interface element opens the respective UI of the software service. The system 100 may also determine, at a data permission layer, whether the data that is presented in one or more respective user interfaces of other services of the plurality of services as a result of the orchestration is editable by a user to update internal databases used by the plurality of services.

In an example embodiment, the system 100 may receive, at the service orchestration layer, an indication that a user is focusing on an item in the respective UI of a first service of the plurality of services; the system 100 may then determine, at the service orchestration layer, which other services of the plurality of services is able to serve information regarding the item that may be of interest to the user based on one or more type of interactions other services of the plurality of services provides. the system 100 may then cause, at the service orchestration layer, the determined other services to automatically provide, within the respective UI of the first service, information regarding the item that may be of interest to the user.

In an example embodiment, the plurality of software services includes, but is not limited to: a trouble ticketing service of a fifth-generation New Radio (5G NR) cellular wireless telecommunication network; an inventory service of a of the 5G NR cellular wireless telecommunication network; a warehouse service of the 5G NR cellular wireless telecommunication network; an order service of the 5G NR cellular wireless telecommunication network; and a network status service of the 5G NR cellular wireless telecommunication network. As one example, electronically orchestrating the plurality of software services may include: receiving, at the service orchestration layer, an indication that a user is focusing in the respective UI of the inventory service on a particular cellular (cell) site of the 5G NR cellular wireless telecommunication network. the system 100 may then determine, at the service orchestration layer, which of the trouble ticketing, warehouse, order and network status services is able to serve information regarding the particular cell site that may be of interest to the user based on one or more interactions the trouble ticketing, warehouse, order and network status services provides regarding cell sites. In response to the indication that the user is focusing in the respective UI of the inventory service on the particular cell site, and based on a determination that the trouble ticketing service provides information regarding submitted tickets related to service issues with cell sites, the system 100 may cause, at the service orchestration layer, the trouble ticketing service to automatically provide within the respective UI of the trouble ticketing service information regarding submitted tickets related to service issues with the particular cell site.

As another example, electronically orchestrating the plurality of software services may include receiving, at the service orchestration layer, an indication that a user is focusing in the respective UI of the inventory service on a particular cellular (cell) site of the 5G NR cellular wireless telecommunication network. the system 100 then determines, at the service orchestration layer, which of the trouble ticketing, warehouse, order and network status services is able to serve information regarding the particular cell site that may be of interest to the user based on one or more interactions the trouble ticketing, warehouse, order and network status services provides regarding cell sites. In response to the indication that the user is focusing in the respective UI of the inventory service on the particular cell site, and based on a determination that the trouble ticketing service provides information regarding submitted tickets related to service issues with cell sites, the system 100 may cause, at the service orchestration layer, the trouble ticketing service to automatically provide within the respective UI of the inventory service information regarding submitted tickets related to service issues with the particular cell site.

Figure 4:
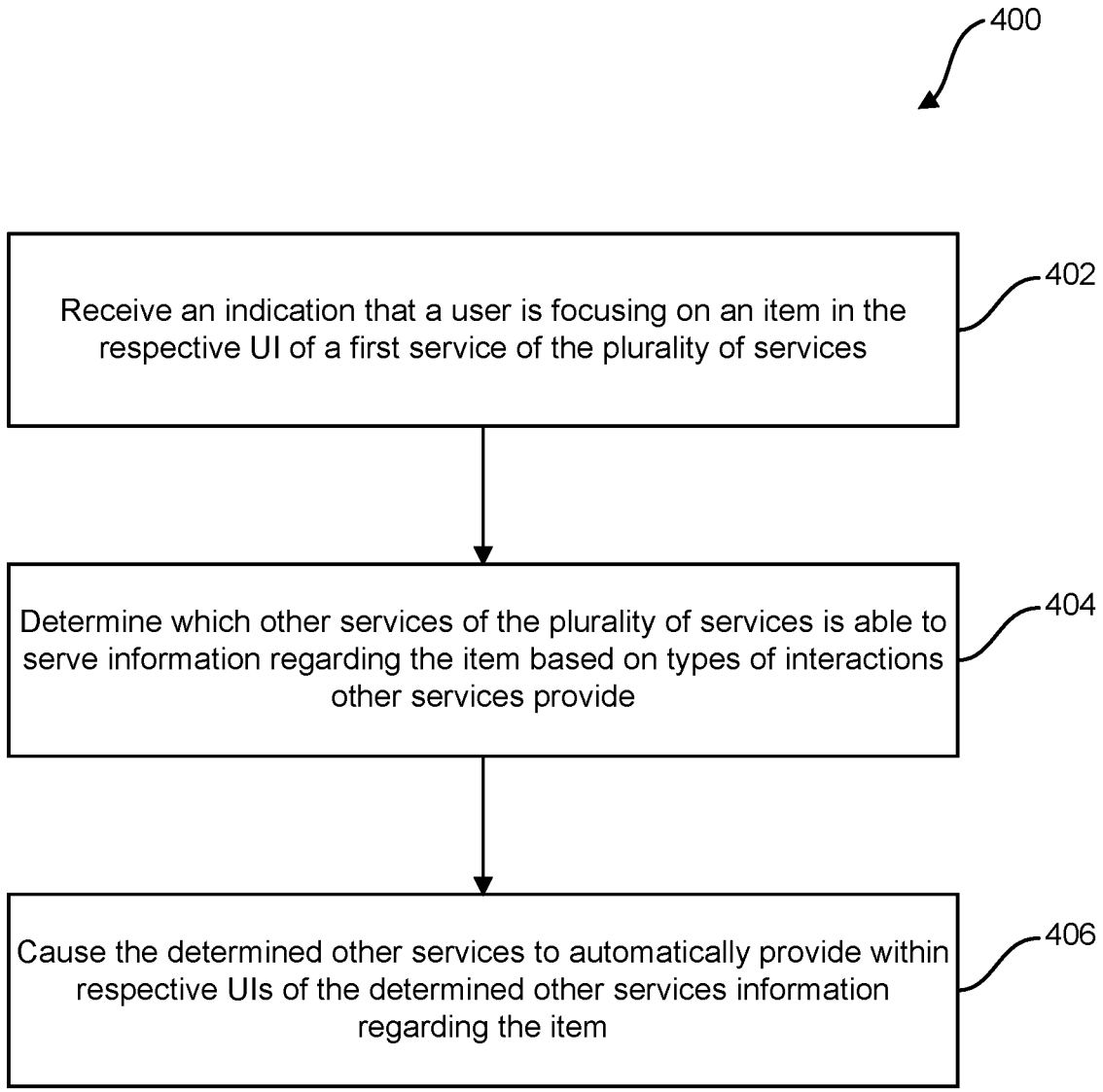
FIG. 4 illustrates a logical flow diagram showing an example embodiment of a process for how information is provided within user interfaces (UIs) in an intelligent user interface for interrelated services in accordance with embodiments described herein.

FIG. 4 illustrates a logical flow diagram showing an example embodiment of a process 400 for how information is provided within user interfaces (UIs) in an intelligent user interface for interrelated services in accordance with embodiments described herein.

At 402, the system receives, at the service orchestration layer, an indication that a user is focusing on an item in the respective UI of a first service of the plurality of services.

At 404, the system 100 determines, at the service orchestration layer, which other services of the plurality of services is able to serve information regarding the item that may be of interest to the user based on one or more types of interactions other services of the plurality of services provide.

At 406, the system 100 causes, at the service orchestration layer, the determined other services to automatically provide within respective UIs of the determined other services information regarding the item that may be of interest to the user.

Figure 5:
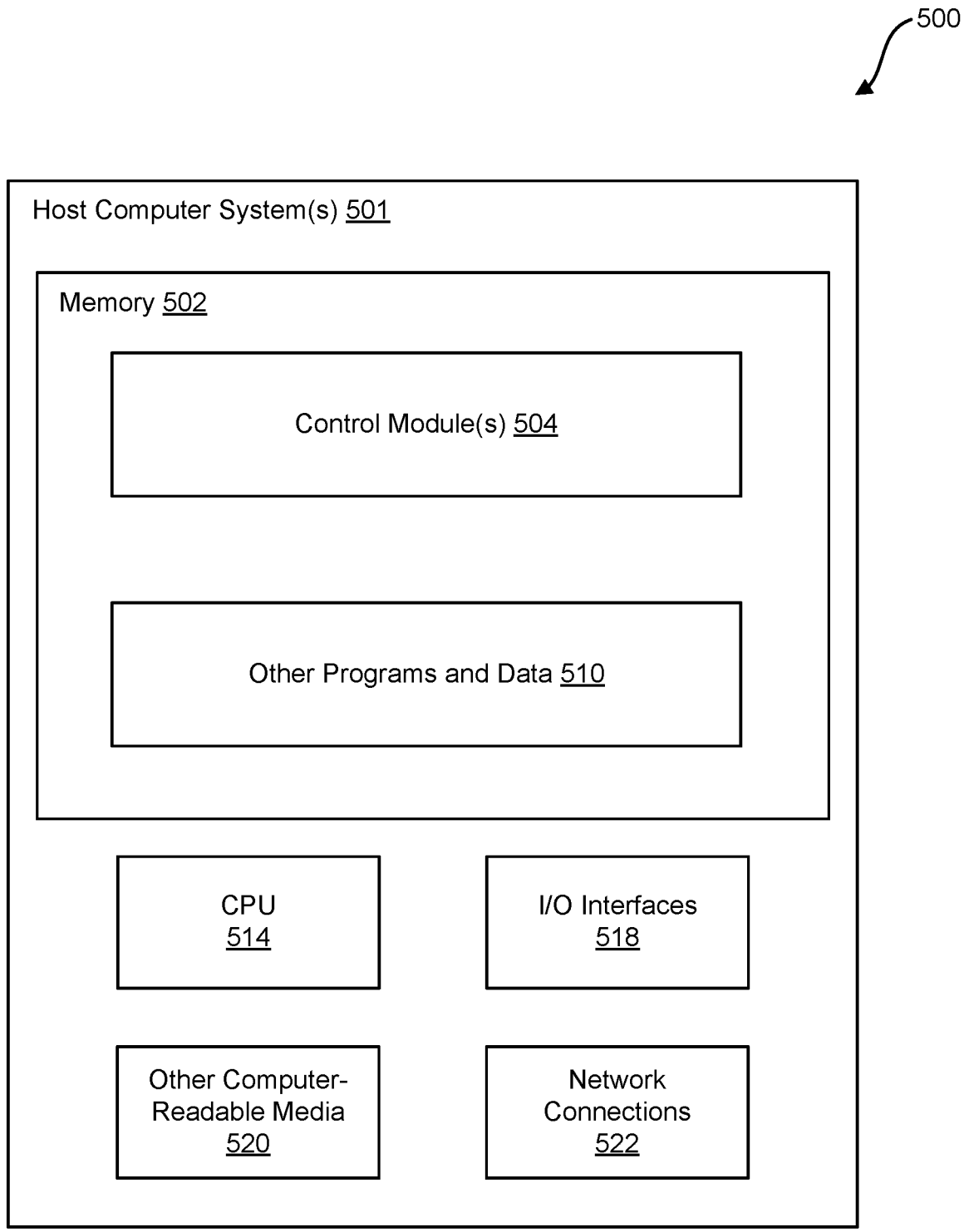
FIG. 5 shows a system diagram that describes an example implementation of computing system(s) for implementing embodiments described herein.

FIG. 5 shows a system diagram that describes an example implementation of computing system(s) 500 for implementing embodiments described herein.

The functionality described herein for an intelligent user interface for interrelated services can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 5 illustrates an example of underlying hardware on which such software and functionality may be hosted and/or implemented. For example, computer system(s) 501 may represent example components of underlying computer hardware for some or all of the components shown in FIG. 1.

In particular, shown is example host computer system(s) 501. For example, such computer system(s) 501 may represent one or more of those in various data centers, control centers, base stations and cell sites and/or other components that are, or that host or implement the functions of: routers, components, microservices, APIs, nodes, node groups, control planes, clusters, virtual machines, NFs, and other aspects described herein for an intelligent user interface for interrelated services. In some embodiments, one or more special-purpose computing systems may be used to implement the functionality described herein. Accordingly, various embodiments described herein may be implemented in software, hardware, firmware, or in some combination thereof. Host computer system(s) 501 may include memory 502, one or more central processing units (CPUs) 514, I/O interfaces 518, other computer-readable media 520, and network connections 522.

Memory 502 may include one or more various types of non-volatile and/or volatile storage technologies. Examples of memory 502 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 502 may be utilized to store information, including computer-readable instructions that are utilized by CPU 514 to perform actions, including those of embodiments described herein.

Memory 502 may have stored thereon control module(s) 1804. The control module(s) 1804 may be configured to implement and/or perform some or all of the functions of the systems, components and modules described herein for an intelligent user interface for interrelated services. Memory 502 may also store other programs and data 510, which may include rules, databases, application programming interfaces (APIs), microservices, SaaS platforms, software containers, nodes, pods, clusters, node groups, control planes, software defined data centers (SDDCs), microservices, virtualized environments, software platforms, cloud computing service software, network management software, network orchestrator software, orchestration layer software, security software, network functions (NF), artificial intelligence (AI) or machine learning (ML) programs or models to perform the functionality described herein, user interfaces, operating systems, other network management functions, other NFs, etc.

Network connections 522 are configured to communicate with other computing devices to facilitate the functionality described herein. In various embodiments, the network connections 522 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 518 may include a video interfaces, other data input or output interfaces, or the like. Other computer-readable media 520 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for an intelligent user interface for interrelated services comprising:
electronically providing a plurality of software services, each having a respective user interface (UI) displayed simultaneously in a graphical user interface;
electronically orchestrating, at a service orchestration layer, the plurality of software services such that when any one service of the plurality of software services is used, usage of the one service automatically affects what data is presented or how the data is presented in one or more respective user interfaces of other services of the plurality of software services;
receiving, at the service orchestration layer, an indication that a user is focusing on a particular cell site in the respective UI of a first service of the plurality of software services;
determining, at the service orchestration layer in response to receiving the indication that the user is focusing on the particular cell site in the respective UI of the first service of the plurality of software services, which of at least one other service of the plurality of software services is able to serve information regarding the particular cell site that may be of interest to the user based on one or more types of interactions the at least one other service of the plurality of software services provides; and
causing, at the service orchestration layer, the determined at least one other service to automatically provide, within the respective UI of the first service or the at least one other service, information regarding the particular cell site that may be of interest to the user;
wherein:
the plurality of software services each having the respective user interface displayed simultaneously in the graphical user interface includes:
a trouble ticketing service of a cellular wireless telecommunication network that provides information regarding submitted tickets related to service issues with cell sites;
an inventory service of the cellular wireless telecommunication network that searches for topology, requests cell site information based on a call record, or checks for model numbers in service; and
a warehouse service of the cellular wireless telecommunication network that searches for device type, places an order for new equipment, or sends equipment to a cell site.

2. The method of claim 1 further comprising:
displaying on a single screen a respective selectable user interface element for each respective UI of the plurality of software services, such that, when selected, the respective selectable user interface element opens the respective UI of the software service.

3. The method of claim 1, further comprising: determining, at a data permission layer, whether the data that is presented in one or more respective user interfaces of other services of the plurality of software services as a result of the orchestration is editable by the user to update internal databases used by the plurality of software services.

4. The method of claim 1 wherein the plurality of software services includes:
an order service of the cellular wireless telecommunication network; and
a network status service of the cellular wireless telecommunication network.

5. The method of claim 4 wherein:
the first service comprises the inventory service; and
electronically orchestrating the plurality of software services includes:
determining, at the service orchestration layer, which of the trouble ticketing service, the warehouse service, the order service, and the network status service is able to serve information regarding the particular cell site that may be of interest to the user based on one or more interactions the trouble ticketing, warehouse, order and network status services provides regarding cell sites; and
in response to the indication that the user is focusing in the respective UI of the inventory service on the particular cell site and based on a determination that the trouble ticketing service provides information regarding submitted tickets related to service issues with cell sites, causing, at the service orchestration layer, the trouble ticketing service to automatically provide within the respective UI of the trouble ticketing service information regarding submitted tickets related to service issues with the particular cell site.

6. The method of claim 4 wherein:

the first service comprises the inventory service; and electronically orchestrating the plurality of software services includes:

determining, at the service orchestration layer, which of the trouble ticketing service, the warehouse service, the order service, and the network status service is able to serve information regarding the particular cell site that may be of interest to the user based on one or more interactions the trouble ticketing, warehouse, order and network status services provides regarding cell sites; and in response to the indication that the user is focusing in the respective UI of the inventory service on the particular cell site and based on a determination that the trouble ticketing service provides information regarding submitted tickets related to service issues with cell sites, causing, at the service orchestration layer, the trouble ticketing service to automatically provide within the respective UI of the inventory service information regarding submitted tickets related to service issues with the particular cell site.

7. A system for an intelligent user interface for interrelated services, the system comprising:

at least one memory that stores computer executable instructions; and at least one processor that executes the computer executable instructions to cause actions to be performed, the actions including:

electronically providing a plurality of software services, each having a respective user interface (UI) displayed simultaneously in a graphical user interface;

electronically orchestrating, at a service orchestration layer, the plurality of software services such that when any one service of the plurality of software services is used, usage of the one service automatically affects what data is presented or how the data is presented in one or more respective user interfaces of other services of the plurality of software services;

receiving, at the service orchestration layer, an indication that a user is focusing on a particular cell site in the respective UI of a first service of the plurality of software services;

determining, at the service orchestration layer in response to receiving the indication that the user is focusing on the particular cell site in the respective UI of the first service of the plurality of software services, which of at least one other service of the plurality of software services is able to serve information regarding the particular cell site that may be of interest to the user based on one or more types of interactions the at least one other service of the plurality of software services provides; and causing, at the service orchestration layer, the determined at least one other service to automatically provide, within the respective UI of the first service or the at least one other service, information regarding the particular cell site that may be of interest to the user;

wherein:

the plurality of software services each having the respective user interface displayed simultaneously in the graphical user interface includes:

a trouble ticketing service of a cellular wireless telecommunication network that provides information regarding submitted tickets related to service issues with cell sites;

an inventory service of the cellular wireless telecommunication network that searches for topology, requests cell site information based on a call record, or checks for model numbers in service; and a warehouse service of the cellular wireless telecommunication network that searches for device type, places an order for new equipment, or sends equipment to a cell site.

8. The system of claim 7, the actions further including:

displaying on a single screen a respective selectable user interface element for each respective UI of the plurality of software services, such that, when selected, the respective selectable user interface element opens the respective UI of the software service.

9. The system of claim 7, the actions further including:

determining, at a data permission layer, whether the data that is presented in one or more respective user interfaces of other services of the plurality of software services as a result of the orchestration is editable by the user to update internal databases used by the plurality of software services.

10. The system of claim 7 wherein the plurality of software services includes:

an order service of the cellular wireless telecommunication network; and a network status service of the cellular wireless telecommunication network.

11. A non-transitory computer-readable storage medium having computer-executable instructions stored thereon that, when executed by at least one processor, cause the at least one processor to cause actions to be performed, the actions including:

electronically providing a plurality of software services, each having a respective user interface (UI) displayed simultaneously in a graphical user interface;

electronically orchestrating, at a service orchestration layer, the plurality of software services such that when any one service of the plurality of software services is used, usage of the one service automatically affects what data is presented or how the data is presented in one or more respective user interfaces of other services of the plurality of software services;

receiving, at the service orchestration layer, an indication that a user is focusing on a particular cell site in the respective UI of a first service of the plurality of software services;

determining, at the service orchestration layer in response to receiving the indication that the user is focusing on the particular cell site in the respective UI of the first service of the plurality of software services, which of at least one other service of the plurality of software services is able to serve information regarding the particular cell site that may be of interest to the user based on one or more types of interactions the at least one other service of the plurality of software services provides; and causing, at the service orchestration layer, the determined at least one other service to automatically provide, within the respective UI of the first service or the at least one other service, information regarding the particular cell site that may be of interest to the user;

wherein:

the plurality of software services each having the respective user interface displayed simultaneously in the graphical user interface includes:
- a trouble ticketing service of a cellular wireless telecommunication network that provides information regarding submitted tickets related to service issues with cell sites;
- an inventory service of the cellular wireless telecommunication network that searches for topology, requests cell site information based on a call record, or checks for model numbers in service; and
- a warehouse service of the cellular wireless telecommunication network that searches for device type, places an order for new equipment, or sends equipment to a cell site.

12. The non-transitory computer-readable storage medium of claim 11, wherein the actions further include:
displaying on a single screen a respective selectable user interface element for each respective UI of the plurality of software services, such that, when selected, the respective selectable user interface element opens the respective UI of the software service.

13. The non-transitory computer-readable storage medium of claim 11, wherein the actions further include: determining, at a data permission layer, whether the data that is presented in one or more respective user interfaces of other services of the plurality of software services as a result of the orchestration is editable by the user to update internal databases used by the plurality of software services.

14. The non-transitory computer-readable storage medium of claim 11, wherein the plurality of software services includes:
- an order service of the cellular wireless telecommunication network; and
- a network status service of the cellular wireless telecommunication network.

* * * * *